United States Patent
Oya et al.

(12) 
(10) Patent No.: US 12,088,227 B2
(45) Date of Patent: Sep. 10, 2024

(54) ELECTRIC MOTOR AND AIR-CONDITIONING APPARATUS INCLUDING THE SAME

(71) Applicant: Mitsubishi Electric Corporation, Tokyo (JP)

(72) Inventors: Junichiro Oya, Tokyo (JP); Mineo Yamamoto, Tokyo (JP); Hiroyuki Ishii, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 307 days.

(21) Appl. No.: 17/785,951

(22) PCT Filed: Feb. 19, 2020

(86) PCT No.: PCT/JP2020/006531
§ 371 (c)(1),
(2) Date: Jun. 16, 2022

(87) PCT Pub. No.: WO2021/166122
PCT Pub. Date: Aug. 26, 2021

(65) Prior Publication Data
US 2023/0012990 A1    Jan. 19, 2023

(51) Int. Cl.
*H02P 27/06* (2006.01)
*H02K 11/33* (2016.01)
*H02P 29/00* (2016.01)

(52) U.S. Cl.
CPC .............. *H02P 27/06* (2013.01); *H02K 11/33* (2016.01); *H02P 29/00* (2013.01)

(58) Field of Classification Search
CPC .................................. H02P 27/06; H02P 29/00
See application file for complete search history.

(56) References Cited

U.S. PATENT DOCUMENTS

| 2015/0121929 | A1* | 5/2015 | Yamada | ................... F24H 4/00 62/238.1 |
| 2016/0036350 | A1* | 2/2016 | Uemura | ............ H02M 7/53871 318/432 |
| 2019/0016371 | A1* | 1/2019 | Urimoto | ................ H02K 11/33 |

FOREIGN PATENT DOCUMENTS

| JP | 2005-304176 A | 10/2005 |
| JP | 2010-088233 A | 4/2010 |

OTHER PUBLICATIONS

International Search Report of the International Searching Authority mailed Apr. 28, 2020 for the corresponding International application No. PCT/JP2020/006531 (and English translation).

* cited by examiner

*Primary Examiner* — Gary A Nash
(74) *Attorney, Agent, or Firm* — Posz Law Group, PLC

(57) ABSTRACT

An electric motor has a mechanism to detect an overcurrent in an inverter circuit. The electric motor includes a rotor, a stator, and a board. The board includes a power transistor, a first resistor, a second resistor, and a constant voltage diode. The power transistor is included in the inverter circuit, which is configured to change a direction of a current that flows through a winding of the stator. The first resistor is provided between the power transistor and a ground terminal, and configured to detect an overcurrent in the inverter circuit. The second resistor is provided between the power transistor and the first resistor, and configured to detect a current that flows through the winding of the stator. The constant voltage diode is connected parallel to the first resistor.

11 Claims, 4 Drawing Sheets

ELECTRIC MOTOR AND AIR-CONDITIONING APPARATUS
INCLUDING THE SAME

CROSS REFERENCE TO RELATED APPLICATION

This application is a U.S. national stage application of PCT/JP2020/006531 filed on Feb. 19, 2020, the contents of which are incorporated herein by reference.

TECHNICAL FIELD

The present disclosure relates to an electric motor including an inverter circuit, and also to an air-conditioning apparatus including the electric motor.

BACKGROUND ART

For example, Patent Literature 1 proposes as a control method for an electric motor, a method in which an inverter circuit is controlled based on a current value detected by a phase-current detection unit. Patent Literature 1 also proposes a method in which an overcurrent in the inverter circuit is detected by an overcurrent protection unit, and a power switching semiconductor included in the inverter circuit is protected from the overcurrent. According to Patent Literature 1, it is possible to make the electric motor smaller and also prevent the inverter circuit from being broken by an overcurrent that flows through the power switching semiconductor.

CITATION LIST

Patent Literature

Patent Literature 1: Japanese Unexamined Patent Application Publication No. 2005-304176

SUMMARY OF INVENTION

Technical Problem

In the configuration disclosed in Patent Literature 1, if a failure occurs in the electric motor because of an arm short-circuit or a phase short-circuit in the inverter circuit, and a large current flows through a resistor for overcurrent detection that is provided as the overcurrent protection unit, the resistor for overcurrent detection burns out. Furthermore, if the resistor for overcurrent detection catches fire, smoke from the resistor is let out from the electric rotor to the outside thereof.

The present disclosure is applied to solve the above problem, and relates to an electric motor that can prevent burnout of a resistor for use in detection of an overcurrent, and an air-conditioning apparatus including the electric motor.

Solution to Problem

An electric motor according to an embodiment of the present disclosure includes a rotor, a stator, and a board. The board includes a power transistor, a first resistor, a second resistor, and a constant voltage diode. The power transistor is included in an inverter circuit configured to change a direction of a current that flows through a winding of the stator. The first resistor is provided between the power transistor and a ground terminal, and configured to detect an overcurrent in the inverter circuit. The second resistor is provided between the power transistor and the first resistor, and configured to detect a current that flows through the winding of the stator. The constant voltage diode is connected parallel to the first resistor.

Advantageous Effects of Invention

In the electric motor according to the embodiment of the present disclosure, the constant voltage diode is connected parallel to the first resistor for detection of an overcurrent. The electric motor can thus prevent the first resistor from being burnt.

DESCRIPTION OF EMBODIMENTS

An electric motor according to an embodiment will be described. It should be noted that the relationships in size between components in figures that will be referred to below may differ from actual ones. In addition, in each of the figures, components that are the same as or equivalent to those in a previous figure or previous figures are denoted by the same reference signs, and the same is true of the entire text of the specification. Furthermore, the configurations of components described in the entire text of the specification are merely examples, and the configurations of the components are not limited to the configurations described in the specification.

Embodiment 1

<Configuration of Electric Motor>

Figure 1:
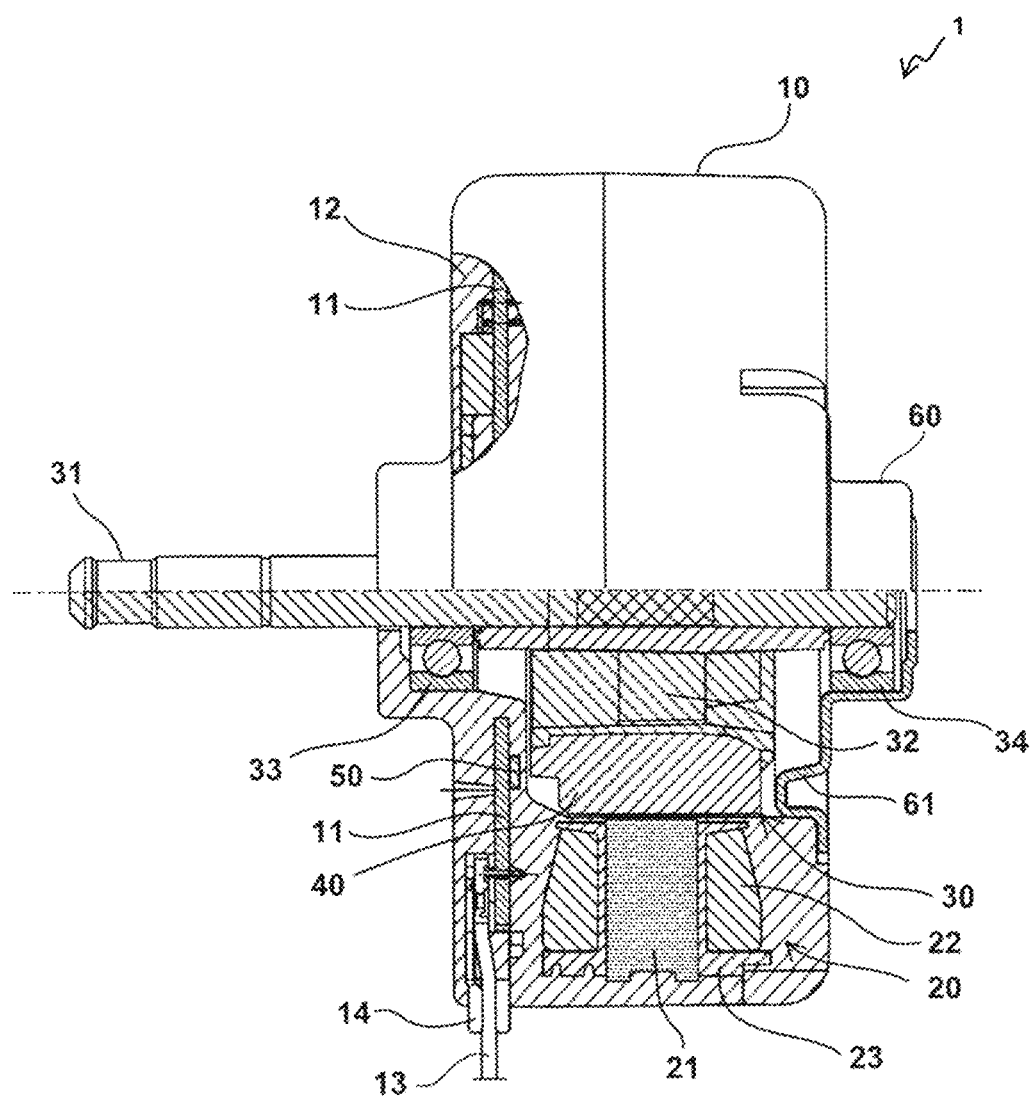
FIG. 1 is a schematic diagram of an electric motor according to Embodiment 1.

FIG. 1 is a schematic diagram of an electric motor 1 according to Embodiment 1. The electric motor 1 according to the embodiment is, for example, a brushless DC motor. FIG. 1 includes a sectional view of part of the electric motor 1 for an explanation of the configuration of the part of the electric motor 1.

As illustrated in FIG. 1, the electric motor 1 includes a rotor 30 in which a rotation shaft 31 is inserted, a stator 20 provided around an outer circumference of the rotor 30, and a built-in board 11 including a circuit that controls driving of the rotor 30. The built-in board 11 and the stator 20 are molded into a single body, using mold resin 12. The built-in board 11 and the stator 20 form a mold stator 10. The mold stator 10 has a recessed portion. The rotor 30 is accommodated in the recessed portion of the mold stator 10. Between the rotor 30 and the rotation shaft 31, a rotor insulating portion 32 is provided. The rotor 30 and the rotation shaft 31 are insulated from each other by the rotor insulating portion 32.

At one end of the rotation shaft 31, an output-side bearing 33 is provided. The output-side bearing 33 supports the rotation shaft 31. At the other end of the rotation shaft 31, a non-output-side bearing 34 is provided. The non-output-side bearing 34 supports the rotation shaft 31. The non-output-side bearing 34 is covered by a conductive bracket 60. An outer ring of the non-output-side bearing 34 is fitted in an inner side of the bracket 60. The bracket 60 is fitted in an inner circumferential portion of the mold stator 10 such that the bracket 60 closes an opening portion of the recessed portion of the mold stator 10.

Figure 2:
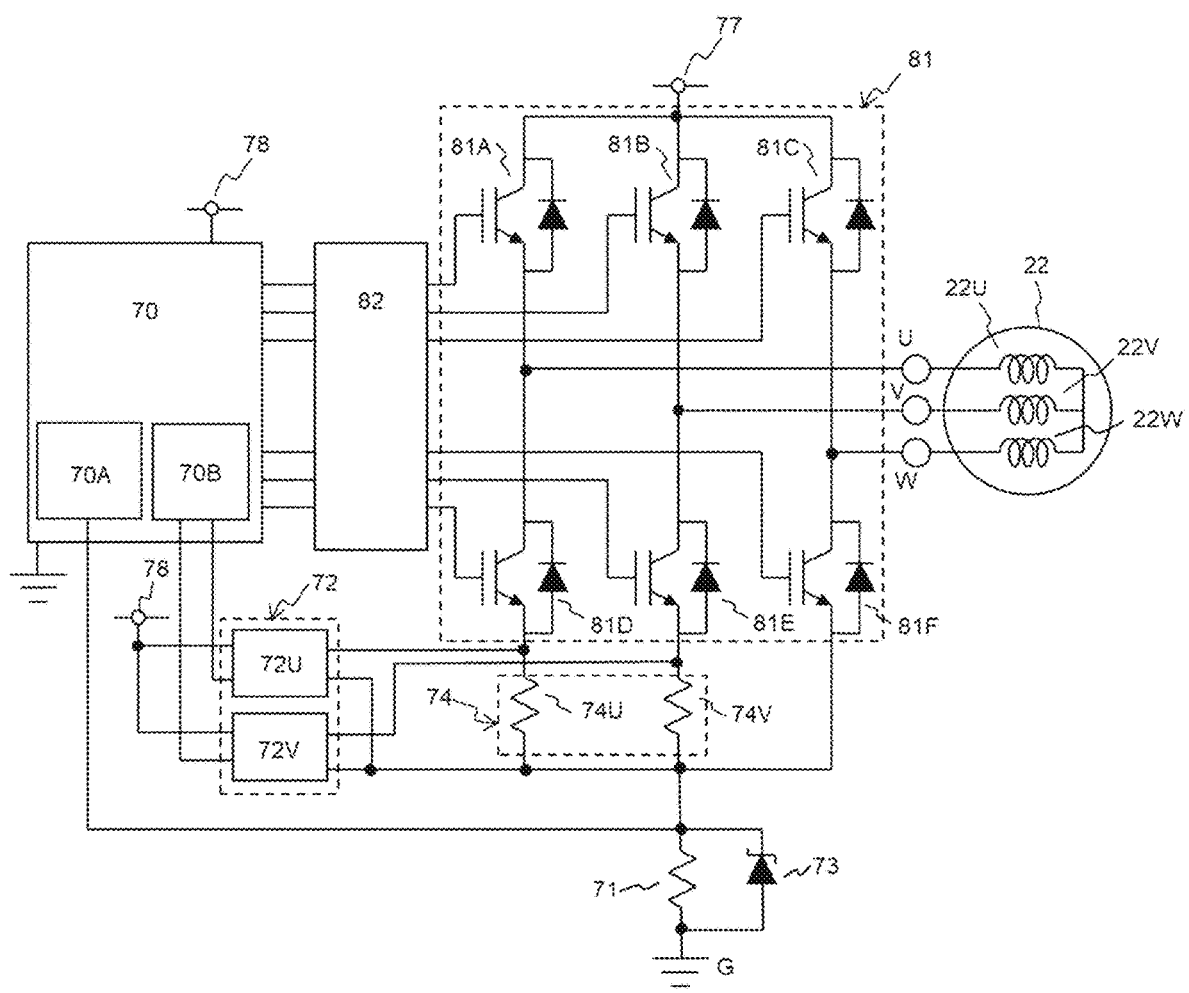
FIG. 2 is a block diagram illustrating a circuit configuration of a built-in board according to Embodiment 1.

The stator 20 has a cylindrical shape. The stator 20 includes a plurality of stator cores 21 located radially from the center of the rotation shaft 31, an insulator 23 molded integrally with the plurality of stator cores 21, and windings 22 that are wound around the plurality of stator cores 21. The stator cores 21 are made up of electromagnetic steel plates stacked together. The windings 22 are conductive wire rods of copper, aluminum, or other material. For example, as illustrated in FIG. 2 which will be referred to, the windings 22 are a U-phase winding 22U, a V-phase winding 22V, and a W-phase winding 22W. In the following description, these U-phase, V-phase, and W-phase windings are sometimes collectively referred to as windings 22. The stator cores 21 and the windings 22 are insulated from each other by the insulator 23.

An outer circumferential surface of the rotor 30 accommodated in the recessed portion of the mold stator 10 faces the stator cores 21. The outer circumferential surface of the rotor 30 is made of a magnet 40. For example, the magnet 40 is formed by injection molding of a permanent magnet such as a ferrite magnet, or injection molding of a bonded magnet that is a mixture of a rare-earth magnet and thermoplastic resin material. In a die for injection molding, magnets are embedded to apply a magnetic field to the magnet 40 to obtain a desired magnetic field orientation during the molding process.

The built-in board 11 is located between the output-side bearing 33 and the stator 20 in an axial direction of the rotation shaft 31. The built-in board 11 is formed in the shape of a disk having a hole located at the center thereof. The rotation shaft 31 is inserted through the hole of the built-in board 11. One surface of the built-in board 11 faces an end face of the stator 20 in the axial direction of the rotation shaft 31. A mounting surface of the built-in board 11 is located to extend in a direction perpendicular to the axial direction of the rotation shaft 31. The built-in board 11 is fixed along with the stator 20 by the mold resin 12.

On the built-in board 11, a magnetic sensor 50 may be mounted. In this case, since the magnetic sensor 50 is located closer to the rotation shaft 31 than the windings 22 of the stator 20, the influence of a magnetic flux generated from the windings 22 of the stator 20 on the magnetic sensor 50 is reduced. As the magnetic sensor 50, for example, a digital output type of magnetic sensor such as a Hall IC and an analog output type of magnetic sensor such as a Hall element are present. As the Hall IC, a non-silicon Hall IC and a silicon Hall IC are present. In the non-silicon Hall IC, a sensor unit and an amplifier unit are made from respective silicon semiconductor chips, the sensor unit is made of a semiconductor other than silicon, and the amplifier unit is made of silicon. In the silicon Hall IC, the sensor unit and the amplifier unit are made from a single silicon semiconductor chip. The non-silicon Hall IC includes two chips therein, and the center of the sensor and the center of an IC body are located at different positions. The sensor unit of the non-silicon Hall IC is made of semiconductor such as indium antimonide (InSb). Such non-silicon semiconductors as described above can, for example, improve the sensibility and reduce an offset due to a strain stress, as compared with silicon semiconductors.

In the case where the magnetic sensor 50 is mounted on the built-in board 11, it is appropriate that the magnet 40 of the rotor 30 has, for example, a sensor magnet portion and a main magnet portion having an outer diameter larger than that of the sensor magnet portion. The sensor magnet portion causes the magnetic sensor 50 to detect the position of the rotor 30. The main magnet portion causes the rotor 30 to produce a rotational force according to a magnetic flux generated by the windings 22. As can be understood from a configuration in which the magnet 40 is a circular column whose central axis corresponds to the rotation shaft 31, the diameter of the sensor magnet portion is smaller than that of the main magnet portion. Thus, a magnetic flux easily flows from a magnetic pole of the sensor magnet portion into the magnetic sensor 50. In a configuration example as illustrated in FIG. 1, the sensor magnet portion and the main magnet portion are distinguishable from each other by a step provided at the magnet 40. It should be noted that in the configuration example as illustrated in FIG. 1, the main magnet portion and the sensor magnet portion of the magnet 40 are made of a single magnet; however, the main magnet portion and the sensor magnet portion may be made of respective magnets.

The built-in board 11 is provided with a lead-in portion 14 for leading a lead 13 into the electric motor 1. The lead 13 connects the electric motor 1 and a high-order system in which the electric motor 1 is provided. The high-order system for the electric motor 1 is a control board of a device in which the electric motor 1 is provided. For example, in the case where the electric motor 1 is provided in an air-conditioner, a control board of the air-conditioner corresponds to the high-order system for the electric motor 1.

<Circuit Configuration>

FIG. 2 is a block diagram illustrating a circuit configuration of the built-in board 11 according to Embodiment 1. As illustrated in FIG. 2, the built-in board 11 includes a power transistor 81 that forms an inverter circuit, a controller 70, a gate drive circuit 82, and an amplifier circuit 72. Between the power transistor 81 and a ground terminal G, a first resistor 71 is provided. Between the power transistor 81 and the first resistor 71, a second resistor 74 is provided. Between both ends of the first resistor 71, a constant voltage diode 73 is connected parallel to the first resistor 71. The controller 70 and the amplifier circuit 72 are connected between a control power supply 78 and the ground terminal G.

In the built-in board 11, the power transistor 81, the controller 70, and the gate drive circuit 82 are included in, for example, a single integrated circuit (IC). The power transistor 81 and the gate drive circuit 82 may be included in a single IC to serve as an intelligent power module (IPM).

As the power transistor 81 operates, the inverter circuit converts a DC voltage to be input from a bus power supply 77 to a three-phase AC voltage. The power transistor 81 is located between the bus power supply 77 and the ground terminal G. The power transistor 81 is made of, for example, six power transistors that are two U-phase power transistors, two V-phase power transistors, and two W-phase power transistors. The power transistor 81 is connected to three-phase windings, that is, U-phase, V-phase, and W-phase windings 22U, 22V, and 22W by winding terminals (not illustrated).

Specifically, the power transistor 81 includes a U-phase upper-arm power transistor 81A, a V-phase upper-arm power transistor 81B, a W-phase upper-arm power transistor 81C, a U-phase lower-arm power transistor 81O, a V-phase lower-arm power transistor 81E, and a W-phase lower-arm power transistor 81F.

The U-phase upper-arm power transistor 81A and the U-phase lower-arm power transistor 81O are connected to the U-phase winding 22U. The V-phase upper-arm power transistor 81B and the V-phase lower-arm power transistor 81E are connected to the V-phase winding 22V. The W-phase upper-arm power transistor 81C and the W-phase lower-arm power transistor 81F are connected to the W-phase winding 22W. In the following description, the U-phase, V-phase, and W-phase power transistors are sometimes collectively referred to as the power transistor 81. As examples of the power transistor 81, a super junction MOSFET, a planar MOSFET, and an IGBT are present.

The second resistor 74 is provided to detect a phase current that flows through each of the U-phase, V-phase, and W-phase windings 22. It suffices that the second resistor 74 is connected to at least two of the U-phase, V-phase, and W-phase lower-arm power transistors. In the example as illustrated in FIG. 2, the second resistor 74 includes a second resistor 74U and a second resistor 74V. The second resistor 74U is provided between the U-phase lower-arm power transistor 81D and the ground terminal G. The second resistor 74V is provided between the V-phase lower-arm power transistor 81E and the ground terminal G. The resistance value of the second resistor 74 is, for example, 1Ω.

A voltage between both ends of the second resistor 74 is input to the amplifier circuit 72. For example, a voltage between both ends of the second resistor 74 is input to a U-phase amplifier circuit 72U, and a voltage between both the ends of the second resistor 74V is input to a V-phase amplifier circuit 72V. The voltage between both ends of the second resistor 74 is amplified in the amplifier circuit 72 and then output to a phase-current detection unit 70B in the controller 70.

The controller 70 produces a switching signal based on the current detected by the phase-current detection unit 703, and outputs the switching signal to the gate drive circuit 82. The phase-current detection unit 703 includes, for example, an A/D converter. The controller 70 may be a dedicated IC such as an application specific integrated circuit (ASIC). The controller 70 may include a memory that stores a program and a central processing unit (CPU) that executes processing according to the program.

In response to the switching signal, the gate drive circuit 82 controls the power transistor 81 to bring it to an on-state or an off-state. The gate drive circuit 82 applies a voltage higher than a threshold voltage to a gate electrode to bring the power transistor 81 into the on-state. The gate drive circuit 82 applies a voltage lower than the threshold voltage to the gate electrode to bring the power transistor 81 into the off-state.

The first resistor 71 is provided between the power transistor 81 and the ground terminal G, and connected between the second resistor 74 and the ground terminal G. The first resistor 71 is provided to detect an overcurrent that flows through the power transistor 81. The resistance value of the first resistor 71 is, for example, 1Ω. The value of a voltage between the both ends of the first resistor 71 is input to an overcurrent detection unit 70A of the controller 70.

When the voltage between the both ends of the first resistor 71 is higher than or equal to a given value, the controller 70 controls the power transistor 81 to bring it into the off-state.

The constant voltage diode 73 connected parallel to the first resistor 71 is, for example, a zener diode. The constant voltage diode 73 has the following characteristics: the constant voltage diode 73 does not allow a current to flow until a voltage to be applied thereto reaches a breakdown voltage, and when the voltage to be applied becomes higher than the breakdown voltage, the constant voltage diode 73 allows flow of a current that causes the voltage to be applied to become equal to the breakdown voltage.

In the case where the constant voltage diode 73 is not connected parallel to the first resistor 71, when an arm short circuit or a phase short circuit occurs in the power transistor 81, an overcurrent flows through the power transistor 81 and also flows through the first resistor 71. In this case, the power transistor 81 is protected by the first resistor 71 from the overcurrent, but the first resistor 71 itself is not protected. Thus, the first resistor 71 may be burnt or catch fire due to the overcurrent, and then produce smoke. Particularly, in the case where a metal-film resistor is used as the first resistor 71, the first resistor 71 is significantly affected by the overcurrent.

In the case where the constant voltage diode 73 is connected parallel to the first resistor 71, when a voltage to be applied to the constant voltage diode 73 reaches the breakdown voltage thereof, a current flows through the constant voltage diode 73. When the voltage to be applied to the constant voltage diode 73 reaches the breakdown voltage because of generation of overcurrent in the power transistor 81, a current flows through the constant voltage diode 73, and the current flowing through the first resistor 71 is thus kept at a constant value. This prevents the overcurrent from flowing through the first resistor 71, and thus prevents the first resistor 71 from being burnt, catching fire, and producing smoke.

<Configuration of Amplifier Circuit>

Figure 3:
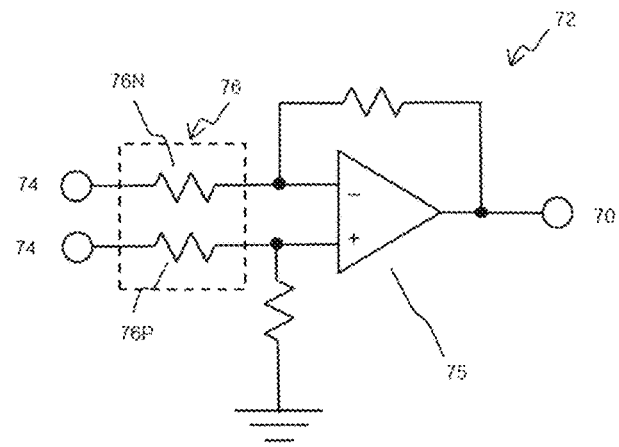
FIG. 3 is a block diagram illustrating a circuit configuration of an amplifier circuit according to Embodiment 1.

FIG. 3 is a block diagram illustrating a circuit configuration of the amplifier circuit 72 according to Embodiment 1. As illustrated in FIG. 3, the amplifier circuit 72 includes an operational amplifier 75, and a plurality of resistors including an amplifier-circuit input resistor 76. In the amplifier circuit 72, a capacitor (not illustrated) is also used to remove noise. The amplifier-circuit input resistor 76 includes a third resistor 76P on a positive side of the amplifier circuit 72 and a fourth resistor 76N on a negative side of the amplifier circuit 72.

As the operational amplifier 75, an operational amplifier that is of rail-to-rail type in output can be used. Since a rail-to-rail type operational amplifier 75 is capable of outputting a voltage ranging from a power-supply voltage to a ground voltage, the amplifier circuit 72 can achieve its maximum amplification factor. In the case of using the rail-to-rail type operational amplifier 75, the amplifier circuit 72 is more resistant to noise and capable of achieving a further stable control with a higher efficiency.

For example, an operational amplifier that is of an output type other than the rail-to-rail type in output may also be used as the operational amplifier 75. In this case, the output of the operational amplifier 75 is lower than the output of the rail-to-rail type operational amplifier 75. It is therefore appropriate that a bias circuit or another circuit (not illustrated) is provided at the input of the operational amplifier 75. Furthermore, in this case, in order to increase an output voltage from the operational amplifier 75, it is appropriate that a voltage of a power supply for the operational amplifier 75 is increased to, for example, 15 V, and a diode (not illustrated) is provided between the control power supply 78 and a signal between the operational amplifier 75 and the controller 70.

<Operation of Electric Motor 1>

Next, the operation of the electric motor 1 will be described. The electric motor 1 is driven to rotate by, for example, a sensor-less control. Under the sensor-less control, the position of the magnetic flux of the magnet 40 of the rotor 30 is estimated from the current values of the windings 22 of the stator 20 and depending on the position of a magnetic pole, the state of each of the six power transistors 81 is switched to the on-state or the off-state at an appropriate timing for each power transistor 81 to obtain a rotational power.

The controller 70 calculates a phase current that flows through each of the windings 22U and 22V, based on the value of a voltage between the both ends of the second resistor 74, which is amplified in the amplifier circuit 72 and input to the phase-current detection unit 70B, and then estimates the positions of the magnetic poles of the magnet 40.

The controller 70 produces a switching command based on the estimated positions of the magnetic poles of the magnet 40 and a speed command signal from the high-order system, and outputs the switching command to the gate drive circuit 82. Based on the switching command output from the controller 70, the gate drive circuit 82 controls the six power transistors 81 to switch the state of each of the six power transistors 81 between the on-state and the off-state. As a result, current is generated in the U-phase, V-phase, and W-phase windings 22U, 22V, and 22W at their respective appropriate timings, thereby causing the rotor 30 to rotate. When detecting the phase current, the controller 70 controls the currents to be reduced to the minimum level, and is thus capable of achieving a more efficient control.

When the value of a voltage between the both ends of the first resistor 71 that is input to the overcurrent detection unit 70A becomes higher than or equal to a given value, the controller 70 determines that an overcurrent is generated in the power transistor 81, and produces a switching signal for bringing the power transistor 81 into the off-state. The switching signal is output to the gate drive circuit 82, and the gate drive circuit 82 forcibly brings the power transistor 81 into the off-state. As a result, the power transistor 81 is protected and prevented from being broken by the overcurrent.

In the case where an overcurrent flows through the power transistor 81 and also flows through the first resistor 71, the flow of the overcurrent in the first resistor 71 is reduced by the constant voltage diode 73, and the first resistor 71 is thus prevented from being burnt, catching fire, or producing smoke due to the overcurrent. Since the constant voltage diode 73 is connected parallel to the first resistor 71, the first resistor 71 can be prevented from being burnt due to the overcurrent, while detecting the overcurrent in the power transistor 81.

The constant voltage diode 73 also reduces application of a surge voltage to the input side of the operational amplifier 75. In order to more effectively reduce application of the surge voltage, it is appropriate that the operational amplifier 75 is provided with the third resistor 76P. The third resistor 76P is provided between the first resistor 71 and one of the input terminals of the operational amplifier 75, which is an input terminal on a positive side of the amplifier circuit 72 connected to an electrode of the second resistor 74 that is closer to the power transistor 81. The third resistor 76P serves as a noise remover and a bias circuit. It is appropriate that the resistance value of the third resistor 76P is, for example, several hundreds of Ω to several thousands of Ω. The application of the surge voltage is more effectively reduced, particularly when the ratio of current detection resistance to the amplifier-circuit input resistor 76 is higher than the ratio of the voltage of the control power supply to the voltage of the bus power supply 77, that is, the ratio of the voltage of the power supply for the operational amplifier 75 to the voltage of the bus power supply 77.

A current that corresponds to three U-phase, V-phase, and W-phase currents flowing through the windings 22U, 22V, and 22W flows to the first resistor 71. Therefore, when the resistance value of the second resistor 74 is higher than one-third of the resistance value of the first resistor 71, it is highly likely that the first resistor 71 can be violently burnt. Even in this case, since the constant voltage diode 73 is provided, the first resistor 71 can be prevented from being burnt.

The above description refers to by way of example the control method in which the phase currents are estimated by the sensor-less control; and the state of the power transistor 81 is switched between the on-state and the off-state. However, in the control method, the position of each of the magnetic poles of the rotor 30 may be estimated using the magnetic sensor 50. Even in this case, by detecting the phase currents, the currents can be controlled to be reduced to the minimum level, and a more efficient control can be achieved.

Also, the above description refers to a configuration in which the controller 70 produces a switching signal for forcibly bring the power transistor 81 into the off-state, based on the voltage between the both ends of the first resistor 71. However, the gate drive circuit 82 may produce a switching signal for forcibly bring the power transistor 81 into the off-state.

The above description refers to a configuration in which the overcurrent detection unit 70A is incorporated in the controller 70. However, the overcurrent detection unit 70A may be incorporated in the gate drive circuit 82.

Furthermore, in addition to the above configuration, a thermosensor to detect the temperature of the power transistor 81 may be provided on the built-in board 11. The power transistor 81 is forcibly brought into the off-state in response to a signal from the thermosensor, and is protected from superheating.

<Example of Location of Constant Voltage Diode 73>

Figure 4:
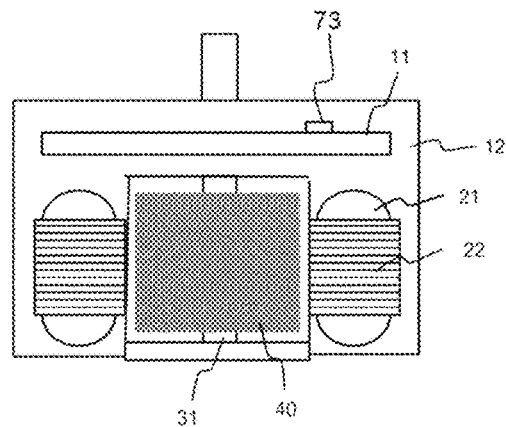
FIG. 4 is a schematic diagram illustrating an example of the location of a constant voltage diode according to Embodiment 1.

FIG. 4 is a schematic diagram illustrating an example of the location of the constant voltage diode 73 according to Embodiment 1. As illustrated in FIG. 4, the constant voltage diode 73 can be mounted on one of the sides of the built-in board 11, which is opposite to the side facing the stator 20. It is therefore possible to improve heat dissipation of the constant voltage diode 73, and further delay breakage of the constant voltage diode 73.

<Example of Location of First Resistor 71>

Figure 5:
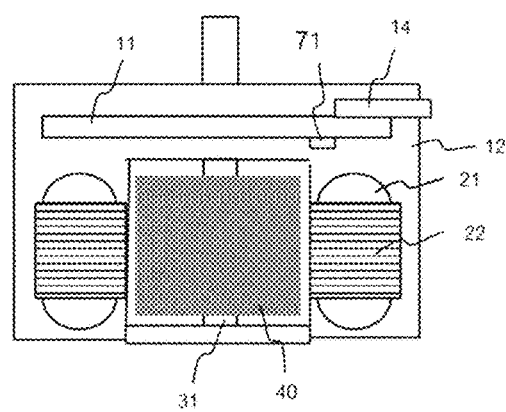
FIG. 5 is a schematic diagram illustrating an example of the location of a first resistor according to Embodiment 1.

FIG. 5 is a schematic diagram illustrating an example of the location of the first resistor 71 according to Embodiment 1. As illustrated in FIG. 5, it is appropriate that the first resistor 71 is provided on one of the sides of the built-in board 11, which is opposite to the side on which the lead-in portion 14 is mounted. If the first resistor 71 is burnt, fire or smoke passes through the gap between the lead-in portion 14 and the mold resin 12 of the stator 20, and moves to the outside, Because of the configuration as illustrated in FIG. 5, it is possible to reduce the amount of fire or smoke that moves to the outside.

In the electric motor 1 according to present Embodiment 1 as described above, when a voltage higher than or equal to a given value is applied to the constant voltage diode 73 connected parallel to the first resistor 7, a current flows through the constant voltage diode 73. Therefore, the amount of current that flows through the first resistor 71 is not increased, Thus, even when a larger amount of current flows through the power transistor 81 due to an arm short circuit in the power transistor 81 or other problems, an overcurrent that flows through the first resistor 71 is reduced. Accordingly, even when an overcurrent is generated in the power transistor 81, the power transistor 81 can be protected, and simultaneously the first resistor 71 can be prevented from being burnt.

The voltage in the amplifier circuit 72 is reduced because of provision of the constant voltage diode 73. Thus, in the amplifier circuit 72, a surge voltage is hard to generate.

Since generation of the surge voltage is reduced by the constant voltage diode 73, it is possible to use, as an operational amplifier that forms the amplifier circuit 72, a rail-to-rail operational amplifier that can output a voltage in the second resistor 74 at a value ranging from the power-supply voltage to the ground.

The third resistor 76P is provided between the operational amplifier 75 and the input terminal of the amplifier circuit 72. The ratio of the resistance value of the second resistor 74 to the resistance value of the third resistor 76P is higher than the ratio of the voltage of the control power supply to the voltage of the bus power supply. Thus, generation of a surge voltage in the amplifier circuit 72 is reduced.

In the electric motor 1 according to present Embodiment 1, even when the resistance value of the first resistor 71 is higher than one-third of the resistance value of the second resistor 74, the constant voltage diode 73 can prevent the first resistor 71 from catching fire or producing smoke.

The electric motor 1 according to present Embodiment 1 can decrease the resistance value of the second resistor 74 to facilitate detection of a current that flows through the windings 22, while avoiding burnout of the first resistor 71.

In the electric motor 1 according to present Embodiment 1, the constant voltage diode 73 is provided on one of the sides of the built-in board 11, which is opposite to the side facing the stator 20, whereby the heat dissipation of the constant voltage diode 73 is improved. It is therefore possible to prevent the constant voltage diode 73 from being broken by heat earlier than the power transistor 81.

Even when the output of the electric motor 1 is higher than or equal to 100 W, the first resistor 71 can be prevented from being burnt, since the constant voltage diode 73 is provided.

The first resistor 71 is provided on one of the sides of the built-in board 11, which is opposite to the side on which the lead 13 is provided. Thus, even if fire or smoke is produced, movement of the fire or smoke to the outside through the lead 13 is reduced.

Embodiment 2

<Example of Applications to Air-Conditioning Apparatus>

Figure 6:
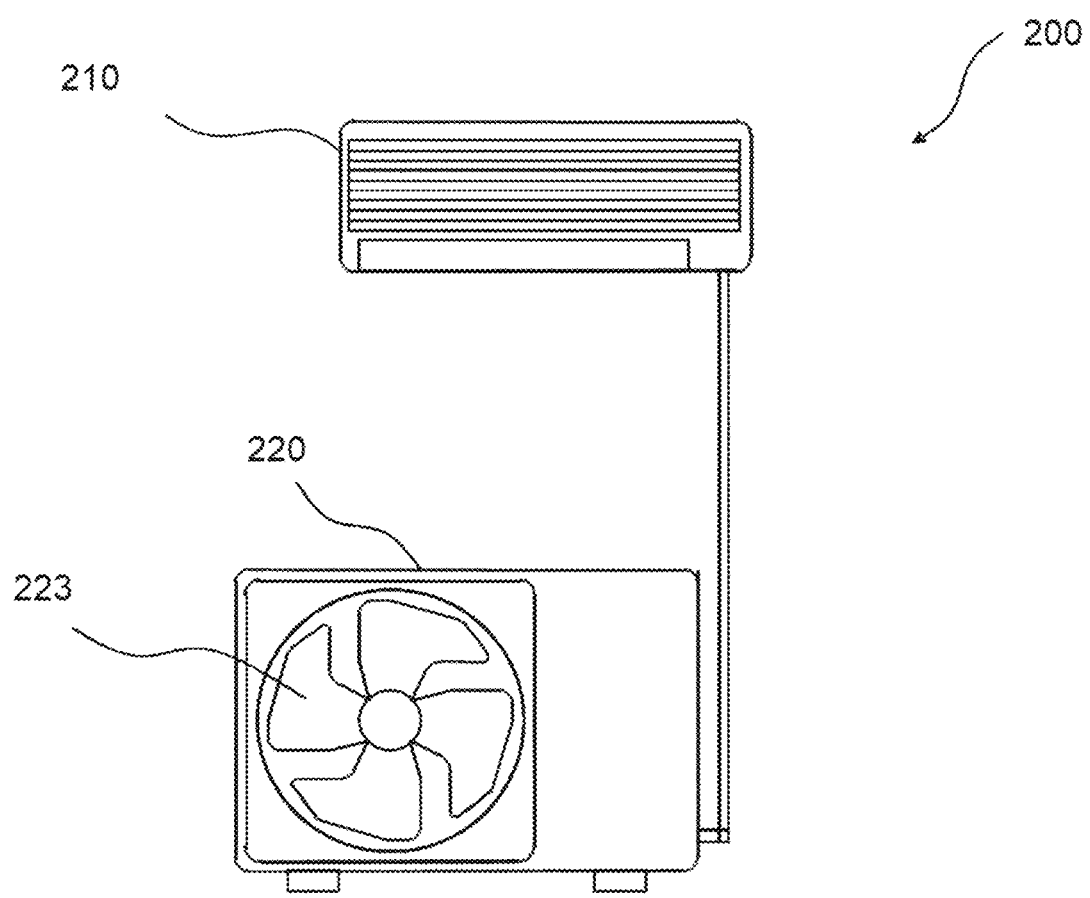
FIG. 6 is a schematic diagram of an air-conditioning apparatus according to Embodiment 2.

FIG. 6 is a schematic diagram of an air-conditioning apparatus 200 according to Embodiment 2. As illustrated in FIG. 6, the air-conditioning apparatus 200 includes an indoor unit 210 and an outdoor unit 220 connected to the indoor unit 210. The indoor unit 210 incorporates an indoor-unit fan 213 therein, and the outdoor unit 220 incorporates an outdoor-unit fan 223 therein. Each of the outdoor-unit fan 223 and the indoor-unit fan 213 incorporates the electric motor 1 according to Embodiment 1 therein as a driving source.

In the case where the air-conditioning apparatus 200 is large-sized, the motor output is increased to 100 W or higher. Even in this case, since the constant voltage diode 73 is connected parallel to the first resistor 71 on the built-in board 11 in the electric motor 1, it is possible to reduce the possibility that the first resistor 71 will be burnt due to an increase in the motor output, or catch fire or produce smoke. Particularly, the electric motor 1 according to Embodiment 1 is provided in a fan motor or other motor for use in an industrial air-conditioner or a package air-conditioner, whereby the electric motor 1 can achieve a significant advantage of reducing the possibility that the first resistor 71 can be burnt or catch fire or produce smoke.

The increase in the output also causes an increase in the level of noise to be applied to the input of the operational amplifier 75. Even in this case, the level of noise in the operational amplifier 75 can be reduced by the constant voltage diode 73.

It should be noted that the electric motor 1 can also be provided and used in, for example, a ventilation fan, a home electric appliance, or a machine tool, as well as the air-conditioning apparatus 200.

REFERENCE SIGNS LIST

1: electric motor, 10: mold stator, 11: built-in board, 12: mold resin, 13: lead, 14: lead-in portion, 20: stator, 21: stator core, 22: winding, 22U: U-phase winding, 22V: V-phase winding, 22W: W-phase winding, 23: insulator, 30: rotor, 31: rotation shaft, 32: rotor insulating portion, 33: output-side bearing, 34: non-output-side bearing, 40: magnet, 50: magnetic sensor, 60: bracket, 70: controller, 71: first resistor, 72: amplifier circuit, 73: constant voltage diode, 74: second resistor, 75: operational amplifier, 76: amplifier-circuit input resistor, 76N: fourth resistor, 76P: third resistor, 77: bus power supply, 78: control power supply, 81: power transistor, 81A: U-phase upper-arm power transistor, 81B: V-phase upper-arm power transistor, 81O: W-phase upper-arm power transistor, 81D: U-phase lower-arm power transistor, 81E: V-phase lower-arm power transistor, 81F: W-phase lower-arm power transistor, 82: gate drive circuit, 200: air-conditioning apparatus, 210: indoor unit, 213: indoor-unit fan, 220: outdoor unit, 223: outdoor-unit fan, G: ground terminal

The invention claimed is:

1. An electric motor comprising:
    a rotor;
    a stator; and
    a board,
    wherein
    the board includes
        a power transistor included in an inverter circuit configured to change a direction of a current that flows through a winding of the stator,
        a first resistor provided between the power transistor and a ground terminal, and configured to detect an overcurrent in the inverter circuit,
        a second resistor provided between the power transistor and the first resistor, and configured to detect a current that flows through the winding of the stator, and
        a constant voltage diode connected parallel to the first resistor.

2. The electric motor of claim 1, further comprising an amplifier circuit configured to amplify a voltage value of the second resistor,
wherein the amplifier circuit includes an operational amplifier.

3. The electric motor of claim 2, wherein the operational amplifier is a rail-to-rail operational amplifier.

4. The electric motor of claim 2, further comprising a controller configured to control the inverter circuit,
wherein the controller and the amplifier circuit are supplied with power from a single power supply.

5. The electric motor of claim 2, wherein
the amplifier circuit includes a third resistor between the operational amplifier and an input terminal of the amplifier circuit, and
a ratio of a resistance value of the second resistor to a resistance value of the third resistor is higher than a ratio of a voltage of a power supply for the amplifier circuit to a voltage of a bus power supply.

6. The electric motor of claim 1, wherein a resistance value of the first resistor is higher than one-third of a resistance value of the second resistor.

7. The electric motor of claim 1, wherein the resistance value of the second resistor is lower than or equal to 1Ω.

8. The electric motor of claim 1, wherein
one side of the board faces end faces of the stator and the rotor in an axial direction of the rotor, and
the constant voltage diode is provided on an other side of the board.

9. The electric motor of claim 1, wherein an output of the electric motor is higher than or equal to 100 W.

10. The electric motor of claim 1, wherein
the board is provided with a lead-in portion that is connected to a lead, and
the lead-in portion is provided on one side of the board, and the first resistor is provided on an other side of the board that is opposite to the one side.

11. An air-conditioning apparatus comprising the electric motor of claim 1.

* * * * *